Dec. 16, 1952 W. A. SCHULTE 2,621,417
GEAR TESTING APPARATUS
Filed Aug. 12, 1946 4 Sheets-Sheet 1

INVENTOR.
WILLIAM A. SCHULTE
BY
Whittemore, Hulbert
& Belknap
ATTORNEYS

Dec. 16, 1952  W. A. SCHULTE  2,621,417
GEAR TESTING APPARATUS
Filed Aug. 12, 1946  4 Sheets-Sheet 2
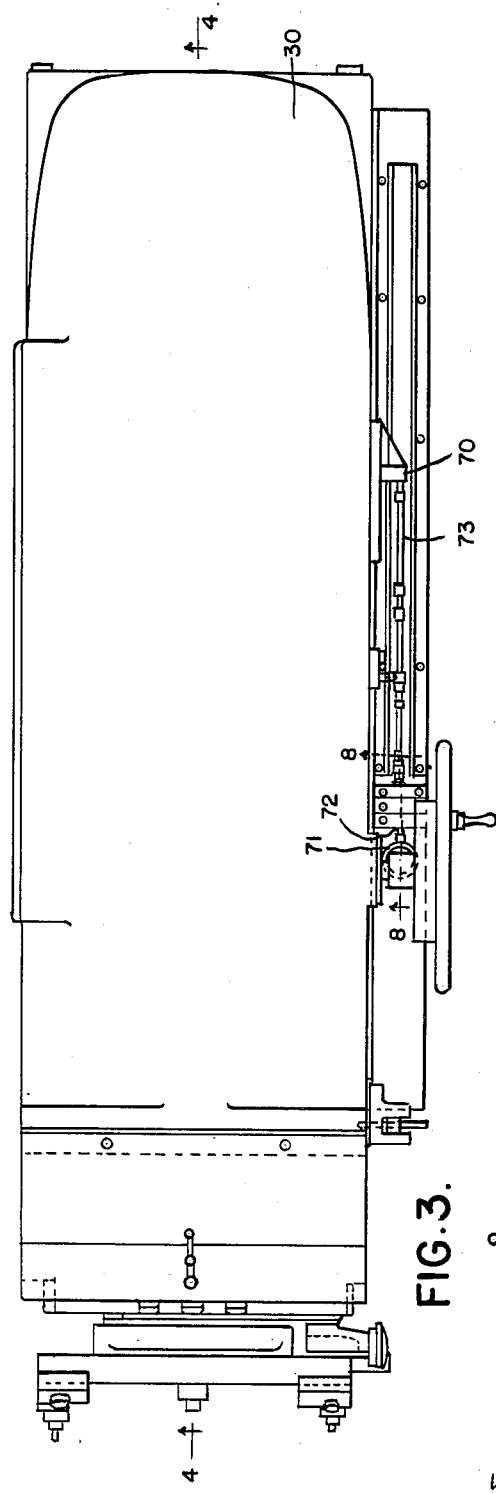
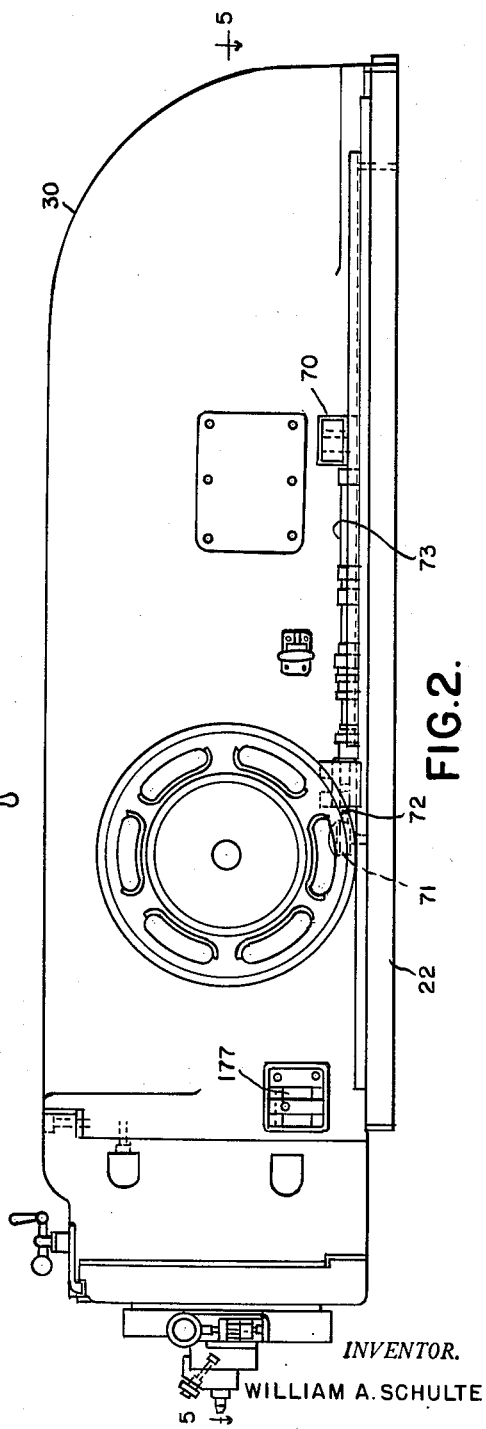
*INVENTOR.*
WILLIAM A. SCHULTE
BY
Whittemore, Hulbert
& Belknap
ATTORNEYS

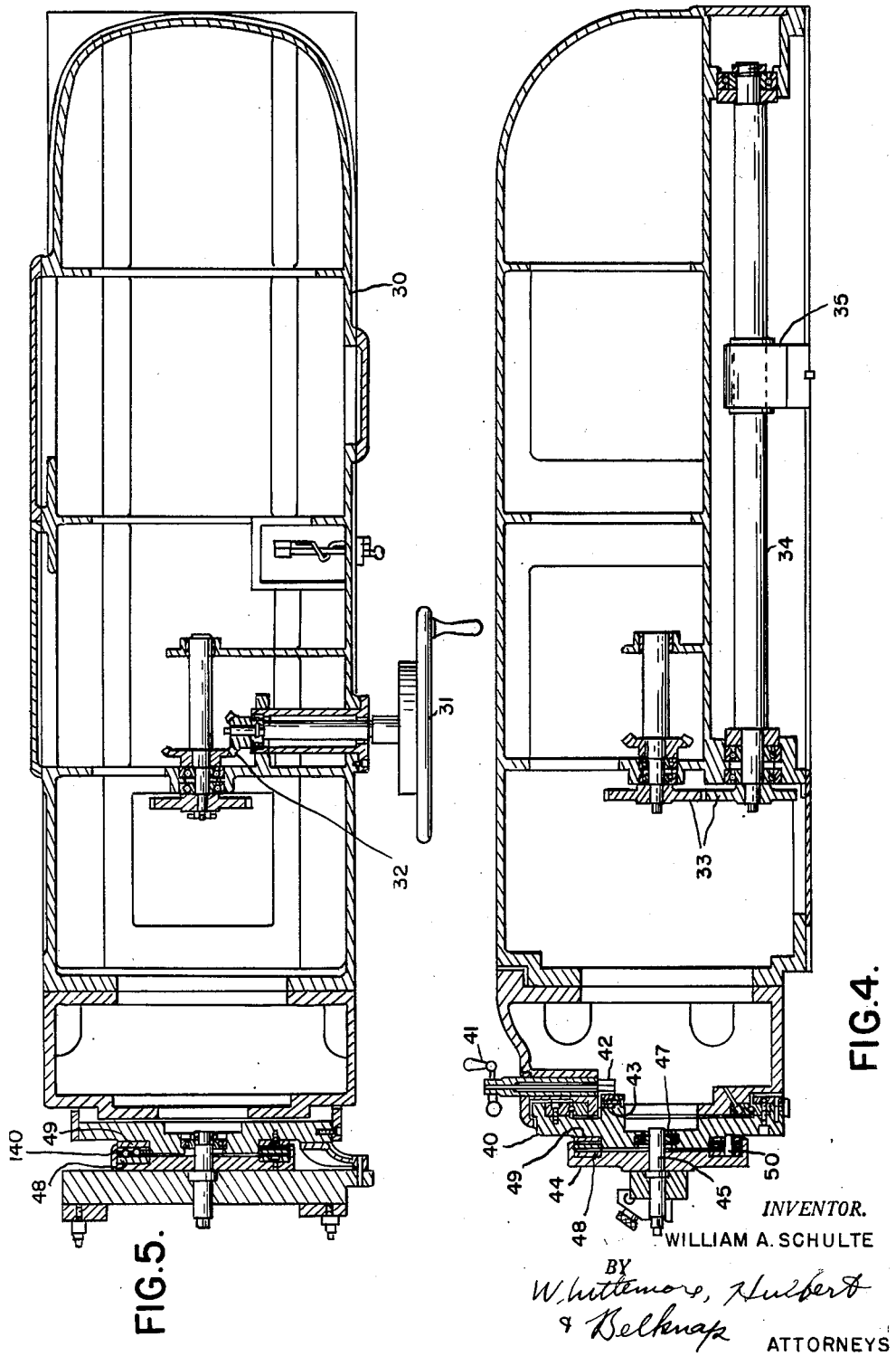

*INVENTOR.*
WILLIAM A. SCHULTE
BY
ATTORNEYS

Patented Dec. 16, 1952

2,621,417

UNITED STATES PATENT OFFICE 2,621,417

GEAR TESTING APPARATUS

William A. Schulte, Allen Park, Mich., assignor to National Broach & Machine Company, Detroit, Mich., a corporation of Michigan Application August 12, 1946, Serial No. 689,928

9 Claims. (Cl. 33—179.5)

The present invention relates to gear testing measuring apparatus and more particularly to a combination lead checker for checking the accuracy of lead of spur or helical gears, and for measuring the pitch radius thereof. This is a continuation-in-part of United States application Serial No. 549,701 filed August 16, 1944, now Patent No. 2,511,418.

Briefly described, the present apparatus comprises a work support for mounting a gear for rotation about its axis, and a checker support movable generally radially toward and away from said work support. Carried by the checker support is a transversely adjustable head having means associated therewith for effecting fine adjustment of the head relative to the checker support in a direction parallel to the axis of the gear. Rotatably mounted on the head is a sine bar having a pair of nose pieces or feelers adjustably mounted thereon for simultaneous adjustment in and out with respect to the axis of rotation of the sine bar. Means are associated with the sine bar for indicating with a high degree of accuracy any motion in rotation which is imparted to the sine bar by moving the nose pieces or feelers into a tooth space or tooth spaces on a gear whose lead is being checked.

It will be appreciated that in the event a spur gear is being checked for accuracy of lead, the nose pieces or feelers will be engaged in a single tooth space. If, however, the lead check is being made on a helical gear it is first necessary to compute or refer to tables to determine the exact spacing necessary between the nose pieces or feelers to cause them to engage in different tooth spaces of the gear without imparting rotation to the sine bar.

The checking apparatus has an additional important function and that is measuring the pitch diameter of gears. The checker support referred to is mounted for movement radially of the gear axis and a zero position is provided corresponding to positioning of the nose pieces at the axis of the gear. Accordingly, when the nose pieces are engaged in a tooth space or tooth spaces of a gear, and when the nose pieces have a form such that they contact the sides of the tooth space or spaces at pitch line thereof, the position of the checker support with reference to the zero position indicates precisely the pitch diameter of the gear.

With the foregoing general description in mind, it is an object of the present invention to provide a simple and easily operated apparatus adapted to effect quick and accurate checking of helical lead and/or pitch diameter. It is a further object of the present invention to provide a lead checker characterized by the use of a sine bar carrying adjustable nose pieces adapted to engage in a tooth space or tooth spaces of a gear to be checked whereby rotation of the sine bar affords an indication of the accuracy of the lead being checked. It is a further object of the present invention to provide a lead checker of the type described in which means are provided for adjusting the gear contacting instrumentalities axially of the gear by fine increments so as to provide for accurate seating thereof in a tooth space or tooth spaces without the necessity of effecting rotation of the gear. It is a further object of the present invention to provide gear checking apparatus characterized by the high degree of accuracy obtainable, the simplicity of the construction thereof, the ease and simplicity of operation thereof, and its adaptability to perform a dual function of checking lead and checking pitch diameter with a single setting of the gear.

Other objects and features of the invention will become apparent as the description proceeds, especially when taken in conjunction with the accompanying drawings, wherein:

Figure 2 is a side elevation of the checker support;

Figure 3 is a plan elevation of the checker support;

Figure 4 is a section on the line 4—4 of Figure 3;

Figure 5 is a section on the line 5—5 of Figure 2;

Figure 1:
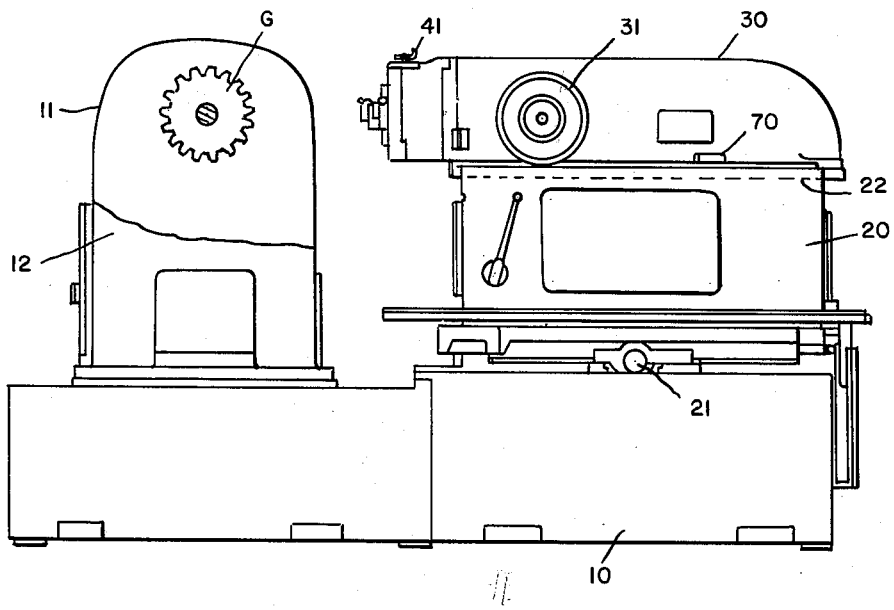
Figure 1 is a side elevation of the improved gear checking apparatus with the parts broken away.

Referring first to Figure 1, there is indicated a main frame 10 having head and tailstocks 11 and 12, respectively, for supporting a gear about to be checked. The present machine is particularly useful in checking lead and pitch diameter of relatively large gears, although it will be appreciated that the principles are equally applicable to checking small gears. However, the apparatus illustrated is designed for checking relatively large gears and hence constitutes a relatively massive piece of equipment. Mounted on the base 10 and movable along ways (not shown) which extend parallel to the axis of the gear G is a main slide 20 adapted to be moved axially of the gear by a suitable feed screw mechanism indicated generally at 21. The main slide 20 is provided adjacent its top with ways indicated at 22 and slidable therein is a checker support 30 which is movable horizontally in a direction perpendicular to the axis of the gear so as to move gear contacting mechanism substantially in a true radial direction with respect to the axis of the gear G. A hand wheel 31 is provided for effecting movement of the support 30 toward and away from the gear. Main slide 20 in use constitutes a part of the stationary base.

Figure 6:
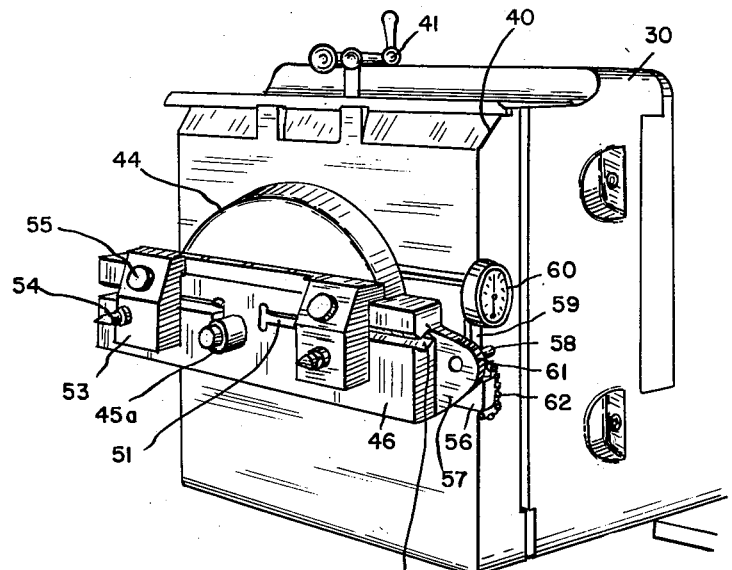
Figure 6 is a perspective view of the head carrying the gear contacting elements of the checking apparatus.
Figure 7:
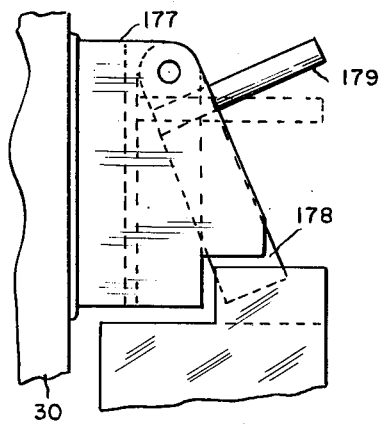
Figure 7 is a fragmentary elevation of means for setting the pitch radius gauge to zero.

Mounted on the forward end of the checker support 30 and as best illustrated in Figure 6 is a relatively adjustable head 40 which is mounted on the checker support 30 for movement transversely thereof and in a direction parallel to the axis of the gear G. A crank 41 is provided which operates a pinion 42 (Figure 4) which meshes with a rack 43 for effecting fine adjustment of the head 40 axially of the gear G.

As best seen in Figures 4 and 5, the checker support 30 is movable along the ways 22 by rotation of the hand wheel 31 which rotates bevel gears 32 and gears 33 which imparts rotation to a lead screw 34 having threaded engagement with a feed nut 35 projecting upwardly from the main slide 20.

The head 40 is provided with a disc 44 which is mounted for rotation therewith about a pivot pin 45. Secured to the front face of the disc 44 is a sine bar 46 which is rotatable therewith about the axis of the pivot pin 45. The pin 45 is provided with a ball bearing 47 in the head 40 which retains the pin 45 and hence the disc 44 against both axial and radial displacement. In addition, the disc 44 is provided with hardened annular rings 48 which cooperate with a similar hardened ring 49 carried at the front face of the head 40.

Figure 9:
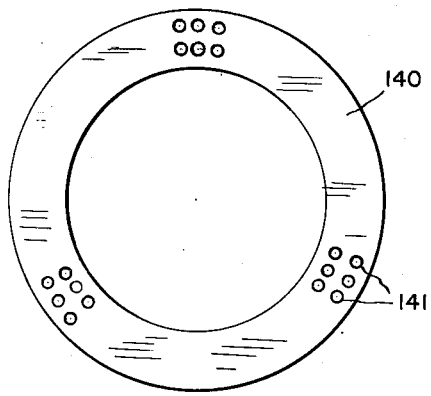
Figure 9 is a diagrammatic view of the ball bearings on the fixture head.

As best seen in Figures 5, 6 and 9, an annular ball bearing race 140 is interposed between between hardened rings 48 and 49. Race 140, as indicated diagrammatically in Figure 9, is arranged to provide hardened balls 141 in groups of three, the groups being spaced at 120° intervals around the race. This insures three point bearing at all times, and tends to prevent injury to the hardened plates which might otherwise result if balls were continuous around the race. Greater insurance of stability can be obtained over the conventional thrust type antifriction bearing, in such an application, by closely grouping the balls (or rollers) in three equally spaced arcuate areas. This arrangement also serves to better distribute the load between respective balls and their adjacent surfaces thereby reducing the maximum imposed stress therein. This valuable feature, as will be readily understood, has a wide application and its utility is not limited to a checking instrument of the type shown herein.

In order to limit relative rotation of the disc 44 and the sine bar 46 a pin 50 is provided which projects forwardly from the head 40 through the hardened plate 49 and extends into a short arcuate slot (not shown) concentric with the pin 45 which is formed in the hardened plate 48.

Referring now to Figure 6, the sine bar 46 is provided with a pair of slots or ways 51 having ways 52 in the bottom thereof in which is slidably mounted a key (not shown). Blocks 53 carrying the nose pieces or feelers 54 are slidable along the sine bar 46 and have bolts 55 extending into the slots 51 and having threaded engagement with the keys referred to. Thus by loosening the bolts 55 the blocks 53 may be slid along the sine bar 46 to any desired position of adjustment.

In the operation of the device, sensing of errors in lead is accomplished by indicating deviation of the sine bar 46 from a true horizontal position or a position parallel to the axis of the gear G being checked. In order to initially set the sine bar 46 in its true parallel or zero position an anvil 56 is provided on the head 40. The sine bar 46 is provided with an ear 57 having a rearwardly projecting pin 58 which is adapted to actuate the arm 59 of an indicator gauge 60. A removable gauge block 61 is provided which is adapted to rest on the anvil 56 and the pin 58 will rest against the upper surface of gauge block 61 when the sine bar 46 is in zero position. At this time the gauge may be set by conventional mechanism to indicate zero. The gauge block 61 is conveniently carried by a chain 62 so that it cannot become separated from the measuring device.

The forwardly projecting portion 45a of the pin 45 which is located on the axis of rotation of the gauge blocks 61 serves as a gauging surface from which the blocks 53 are set. It will be appreciated that the method employed in measuring variations in true lead is to set the gauge blocks equal distances from the gauging surfaces of the pin projection 45a, these distances being computed or determined from reference to tables such that when the nose pieces or feelers 54 are firmly seated in adjacent tooth spaces of a helical gear, no rotation will be imparted to the sine bar 46 if a true lead is present on the gear teeth. If, however, an error in lead is present in the gear teeth it will be appreciated that the sine bar 46 will be slightly rotated from its zero position and that the indicator gauge 60 will give an indication of the amount of rotation of the sine bar 46 and hence an indication of the amount and direction of lead error.

In the event that the gear whose lead is being checked is a spur gear, it will of course be appreciated that the problem is simplified in the sense that the feelers 54 may be located any convenient but equal distance from the portion 45a of the pin 45 and that if a true lead is present in the spur gears, the sine bar will remain in its zero position when the feelers 54 are firmly seated. However, with spur gears, transverse adjustment of the head 40 will not result in alignment of feelers 54 with tooth spaces, and thus with heavy gears care must be exercised to avoid injury to the feelers 54 in rotating the gear to align tooth spaces with the nose pieces or feelers.

However, in the event that the gear being checked is a relatively heavy gear, the final movement of the nose pieces 54 into the tooth space or tooth spaces of the gear will be accompanied by a suitable slight adjustment of the head 40 in a direction parallel to the axis of the gear by manipulation of the hand wheel 41. This will properly align the nose pieces 54 with their respective tooth spaces and will avoid placing a strain on the delicate measuring instrumentalities. It will be appreciated of course that if the gear being checked is a relatively light gear, an equivalent result could be obtained by effecting a slight rotation of the gear. However, where the gear is heavy it is as a practical matter impossible to effect slight rotations thereof without imposing severe side strains on the feelers 54 which would affect the accuracy of the device.

Where the checking apparatus is to be employed in determining the pitch diameter of the gear G, additional gauge and actuating devices are employed.

Referring now to Figures 2, 3, 7 and 8, there is shown an abutment 70 carried by the checker support 30. Mounted on the top of slide 20 adjacent ways 22 is an indicator gauge 71 having an actuating finger 72. The abutment 70 is positioned on the checker support 30 in such a position that its spacing from the end of the actuating finger 72 forms a measurement of the pitch radius of a gear when a feeler or feelers such as 54 are seated in a tooth space or tooth spaces of a gear G to be checked so as to engage the tooth surfaces at the pitch line thereof. For this purpose the nose pieces 54 are preferably conical and their cone angle corresponds to the pressure angle of the gear being checked. Conveniently the spacing between the abutment 70 and the finger 72 of the gauge 71 is effected by providing a series of gauge bars 73 slidable in a V-way on top of slide 20. If desired, the gauge bars 73 may include an element whose length can be varied by very small increments so as to provide in effect a micrometer adjustment for the spacing means.

Figure 8:
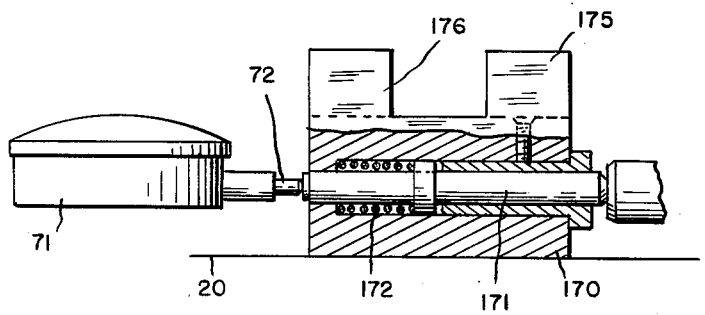
Figure 8 is a fragmentary section on line 8, Figure 3.

Referring now particularly to Figure 8, there is indicated mechanism insuring accuracy in reading the pitch radius measured. Secured to slide 20 adjacent gauge 71 is a housing 170 having a spring biased plunger 171 therein. Spring 172 is relatively strong, and as gauge blocks 73 (Figure 2) are moved to the left by abutment 70, spring 172 insures that they firmly interengage before plunger 171 moves to impart movement to gauge finger 72.

Housing 170 has a pair of ears 175 on its top, the surfaces 176 between the ears being accurately machined. Carried by checker support 30 is a block 177 which has pivoted thereto a gauge piece 178. Finger piece 179 is secured thereto for swinging gauge piece 178 to the position shown in Figure 7. To operate, checker support 30 is moved to the right as seen in Figure 2 until gauge piece 178 registers with the slot between machined surfaces 176, at which time gauge piece 178 is swung into the slot to check accuracy of position of checker support 30. At this time gauge bars equivalent to the known pitch radius corresponding to the position of checker support 30 are in place, and gauge 71 is set to zero.

One of the advantageous features of the present invention is that in effecting both lead and pitch diameter, an initial set-up is provided such that a zero indication of the respective gauges will indicate both true lead and predetermined pitch diameter. Furthermore, variations in pitch diameter and lead will appear directly as plus and minus readings on the respective indicator gauges. It will be appreciated that in checking lead of a relatively wide gear it is preferable to set the feelers 54 the maximum distance apart so as to increase accuracy of reading. In other words, with a wide gear of small helix angle there may be two or three possible settings of the feelers 54 in which at the closest setting the feelers would engage adjacent tooth spaces while in the position of furthest separation they might engage tooth spaces separated by one or more others.

While there has been illustrated and described in considerable detail a preferred embodiment of apparatus for checking lead and pitch diameter of gears, it will be appreciated that equivalent devices could be produced for checking either lead or pitch diameter alone and that the complete illustration and description of the preferred embodiment of the present invention has been given merely to enable those skilled in the art to practice the invention, the scope of which is indicated by the appended claims.

What I claim as my invention is:

1. Lead checking apparatus comprising a work support for mounting a gear, a checker support relatively movable toward and away from said work support, a pair of spaced feelers on said checker support mounted for movement about an axis perpendicular to and intersecting the gear axis, and measuring means for indicating movement of said feelers about said axis when said feelers are in firm contact on both sides with one or more tooth spaces of a gear on said work support, said feelers being adjustable radially of said axis, whereby they may be set to the proper spacing to seat in different tooth spaces of a helical gear while remaining in the plane defined by the intersecting axes aforesaid.

2. Lead checking apparatus comprising a work support for mounting a gear, a checker support relatively movable toward and away from said work support, a head on said checker support adjustable thereon in a direction parallel to the axis of a gear on said work support, a pair of spaced feelers on said head mounted for movement about a second axis intermediate said feelers and perpendicular to and intersecting the gear axis, means for adjusting said feelers toward and away from said second axis, and measuring means for indicating movement of said feelers about said axis when said feelers are in firm contact on both sides with one or more tooth spaces of a gear on said work support.

3. Lead checking apparatus comprising a work support for mounting a gear, a checker support relatively movable toward and away from said work support, a head on said checker support adjustable thereon in a direction parallel to the axis of a gear on said work support, a pair of spaced feelers on said head mounted for movement about a second axis intermediate said feelers and perpendicular to and intersecting the gear axis, means for adjusting said feelers toward and away from said second axis, and measuring means for indicating movement of said feelers about said axis when said feelers are in firm contact on both sides with one or more tooth spaces of a gear on said work support, and adjusting means for making fine adjustments of said head relative to a gear.

4. Lead checking apparatus comprising a support for a gear to be checked, a checker support movable radially of said gear, a sine bar rotatable on said checker support about an axis radial of said gear having a zero position parallel to the axis of said gear, a pair of feelers adapted to seat in tooth spaces of said gear, said feelers being spaced apart equal distances on opposite sides of the axis of rotation of said sine bar, said distances being such that for a gear having true lead, said feelers will seat in adjacent tooth spaces of a helical gear without rotating said sine bar, and a gauge for indicating slight rotation of said sine bar to indicate error in lead, said feelers being adjustable radially of said sine bar to accommodate gears of various leads.

5. Gear checking apparatus comprising a frame, a work support for a gear to be checked on said frame, a checker support movable on said frame toward and away from said work support, a sine bar on said checker support extending generally parallel to the axis of a gear on said work support, a rotary support for said sine bar having an axis perpendicular to and intersecting the axis of the gear, and feelers on said sine bar at opposite sides of the axis thereof independently adjustable longitudinally thereon toward and away from its axis, and indicator mechanism for measuring deviation of said sine bar from parallelism with the axis of the gear.

6. Apparatus as defined in claim 5 in which said sine bar has an indicator actuating member, said checker support is provided with an anvil having a gauge surface adjacent the member, and a removable gauge block to be interposed between said anvil and said member to set said indicator at zero.

7. Lead checking apparatus comprising a base, a work support on said base for mounting a gear to be checked, a checker support movable on said base toward and away from said work support, a head on said checker support adjustable thereon in a direction parallel to the axis of the gear to be checked, a sine bar rotatably mounted on said head for rotation about an axis perpendicular to and intersecting the axis of the gear to be checked, a pair of spaced feelers on said sine bar at opposite sides of the axis of rotation thereof, means for adjusting said feelers independently longitudinally of said sine bar to positions such that for a gear of correct lead said sine bar is parallel to the axis of the gear, an indicator on said head positioned to indicate movement of said sine bar out of parallelism with the axis of the gear to be checked, cooperating abutments located respectively on said base and said checker support, means intermediate said abutments for supporting gauge blocks, rigid mounting means for one of said abutments permitting sliding movement of said abutment relative thereto in a direction toward and away from said other abutment, spring means opposing movement of said movable abutment in a direction away from said other abutment, an indicator adjacent said mounting means in position to be actuated by movement of said movable abutment relative to its mounting means.

8. Lead checking apparatus comprising a base, a work support on said base for mounting a gear to be checked, a checker support movable on said base toward and away from said work support, a head on said checker support adjustable thereon in a direction parallel to the axis of the gear to be checked, a sine bar rotatably mounted on said head for rotation about an axis perpendicular to and intersecting the axis of the gear to be checked, a pair of spaced feelers on said sine bar at opposite sides of the axis of rotation thereof, means for adjusting said feelers independently longitudinally of said sine bar to positions such that for a gear of correct lead said sine bar is parallel to the axis of the gear, an indicator on said head positioned to indicate movement of said sine bar out of parallelism with the axis of the gear to be checked, cooperating abutments located respectively on said base and said checker support, means intermediate said abutments for supporting gauge blocks, rigid mounting means for one of said abutments permitting sliding movement of said abutment relative thereto in a direction toward and away from said other abutment, spring means opposing movement of said movable abutment in a direction away from said other abutment, an indicator adjacent said mounting means in position to be actuated by movement of said movable abutment relative to its mounting means, and locating means comprising cooperating members carried by said base and checker support engageable when said checker support is in position corresponding to zero pitch diameter of a work gear, said abutments being directly engageable at such time to permit accurate zero setting of said last mentioned indicator.

9. Gear checking apparatus comprising a base, a work support on said base for supporting a gear to be checked, a sine bar movable on said support toward and away from the gear, means mounting said sine bar for rotation about an axis perpendicular to and intersecting the axis of the gear, means on said sine bar spaced equally thereon from the axis thereof disposed to enter into one or more tooth spaces of the gear to be checked when the sine bar is parallel to the axis of the gear, if the helix angle or lead of the gear teeth is correct, means for indicating movement of said sine bar out of parallelism with the gear axis to indicate an error in lead, additional means for indicating the displacement of said sine bar radially from the axis of said gear so as to give a simultaneously measurement of the pitch diameter of the gear.

WILLIAM A. SCHULTE.

REFERENCES CITED

The following references are of record in the file of this patent:

UNITED STATES PATENTS

| Number | Name | Date |
| --- | --- | --- |
| Re. 22,953 | Praeg | Dec. 23, 1947 |
| 1,303,198 | Harris | May 6, 1919 |
| 1,538,564 | Leon | May 19, 1925 |
| 1,862,146 | Hoke | June 7, 1932 |
| 2,026,784 | Hansen | Jan. 7, 1936 |
| 2,295,206 | Fraumann | Sept. 8, 1942 |
| 2,336,747 | Palmquist | Dec. 17, 1943 |
| 2,345,298 | Semar | Mar. 28, 1944 |
| 2,476,189 | Guetzkow | July 12, 1949 |
| 2,504,961 | Braaten | Apr. 25, 1950 |

FOREIGN PATENTS

| Number | Country | Date |
| --- | --- | --- |
| 460,008 | Great Britain | Jan. 19, 1937 |